United States Patent [19]

Cvijanovich et al.

[11] Patent Number: 4,568,509

[45] Date of Patent: Feb. 4, 1986

[54] ION BEAM DEVICE

[76] Inventors: George B. Cvijanovich, 30 Cumberland Rd., Glen Rock, N.J. 07452; George C. Brumlik, 154 Upper Mountain Ave., Montclair, N.J. 07042

[21] Appl. No.: 522,243

[22] Filed: Aug. 10, 1983

Related U.S. Application Data

[63] Continuation of Ser. No. 195,826, Oct. 10, 1980, abandoned, which is a continuation of Ser. No. 811,704, Jun. 30, 1977, abandoned.

[51] Int. Cl.⁴ .............................................. G21B 1/00
[52] U.S. Cl. .................................... 376/109; 376/117; 376/127
[58] Field of Search ............... 376/109, 151, 152, 314; 204/119, 129

[56] References Cited

U.S. PATENT DOCUMENTS

| | | | |
|---|---|---|---|
| 2,251,190 | 7/1941 | Kallmann et al. | 376/109 |
| 3,094,474 | 6/1963 | Gale | 376/151 |
| 3,107,210 | 10/1963 | Mallinckrodt | 376/151 |
| 3,417,245 | 12/1968 | Schmidt | 376/109 |
| 3,609,369 | 9/1971 | Croitoru | 376/151 |
| 3,766,390 | 10/1973 | Fabian | 376/109 |
| 3,963,826 | 6/1976 | Anderson et al. | 376/314 |
| 3,975,170 | 8/1976 | Keating, Jr. | 376/314 |
| 4,227,977 | 10/1980 | Grantham | 204/129 |
| 4,268,363 | 5/1981 | Coughlin | 204/119 |

OTHER PUBLICATIONS

Nuclear Technology, vol. 29 (6/76), pp. 327-336, Grand et al.

Primary Examiner—Sal Cangialosi
Attorney, Agent, or Firm—Sprung Horn Kramer & Woods

[57] ABSTRACT

A nuclear fusion device comprising a condensed phase fuel element and accelerated ion beams which ionize and compress the fuel element and initiate nuclear fusion reactions. In one of the embodiment beams comprising electrons in addition to ions are employed. A method is provided comprising synchronization, acceleration and focusing of the said beams on the fuel target. Another object of the invention is to provide an apparatus and method for a continuous nuclear fusion process. Another object is a clean fusion process. A further object of the invention is to provide a neutron generator.

9 Claims, 6 Drawing Figures

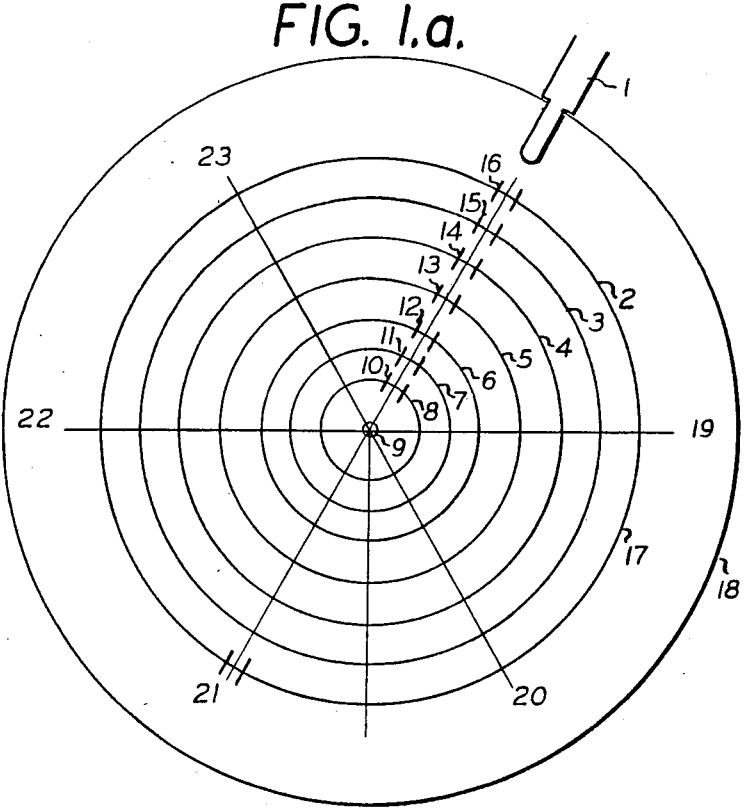
FIG. 1.a.
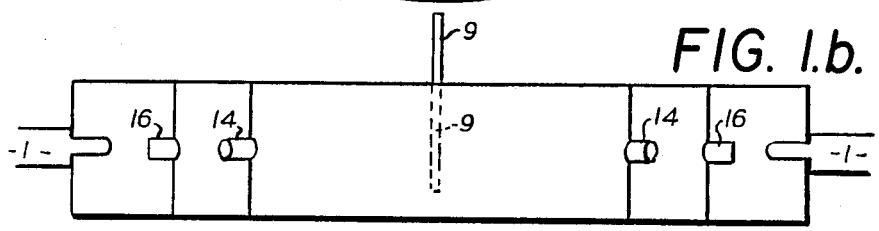
FIG. 1.b.
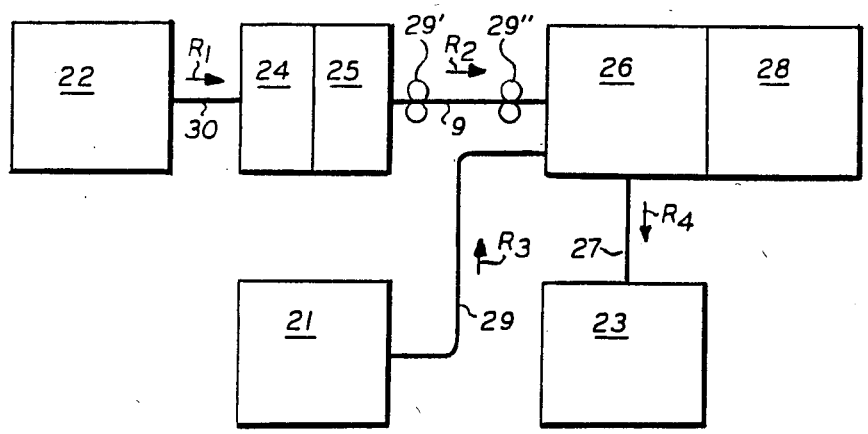
FIG. 2.

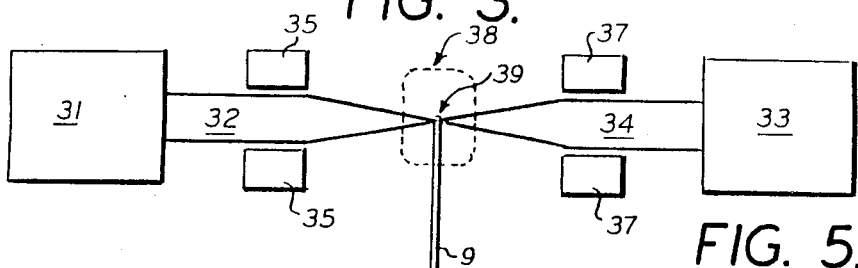
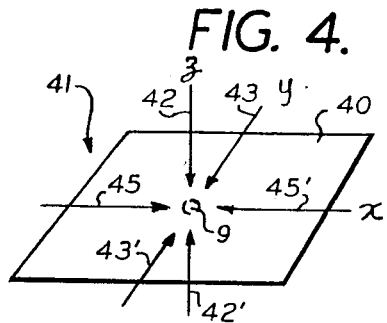
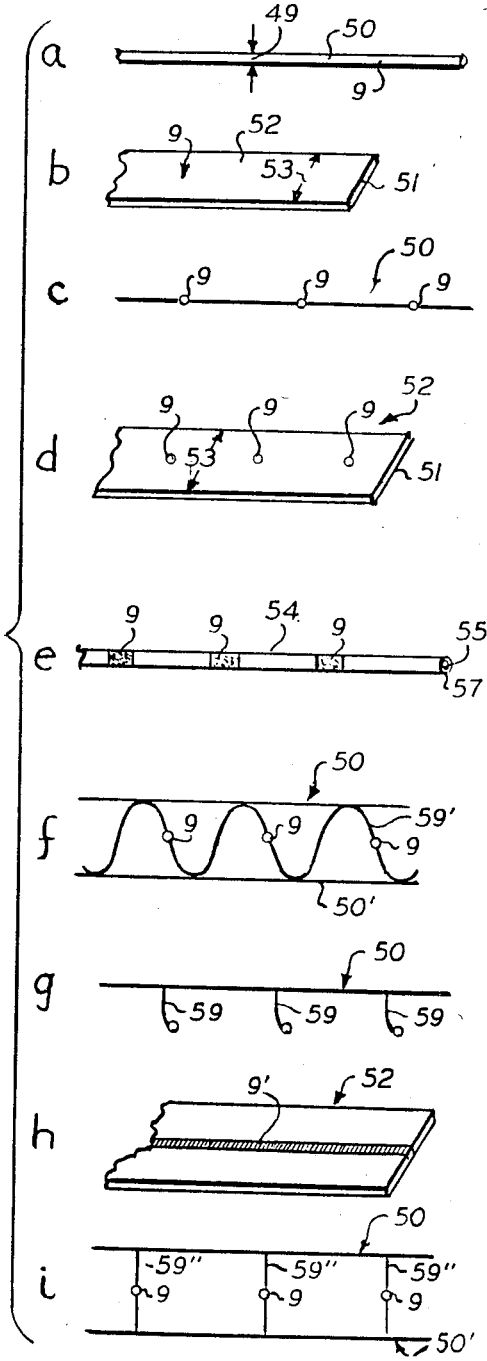
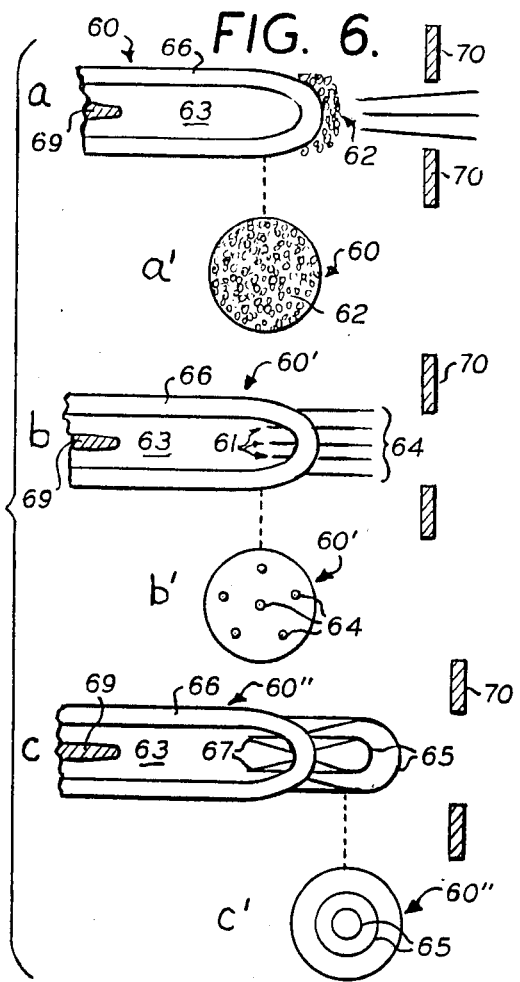

ION BEAM DEVICE

This application is a continuation of application Ser. No. 195,826, filed Oct. 10, 1980, which in turn is a continuation of Ser. No. 811,704, filed June 30, 1977, both now abandoned.

BACKGROUND

Laser beam and electron beams have been used to produce fusion reactions involving heavy isotopes of hydrogen. This method suffers from a number of drawbacks which the method using ion beams seeks to obviate. Among these disadvantages are: the beams of the prior art do fail to carry energetic nuclear reactants in to the reaction zone; the nuclear reaction rely on thermal heating rather than on an accelerated ion beam reaction mechanism; the prior art experiences severe difficulties in the attempts to correlate the acceleration, focusing, synchronizing of all beams. The apparatus and the method of the present invention seek to overcome the above listed drawbacks of prior art.

SUMMARY

The nuclear fusion device of the present invention makes use of a condensed state fuel element which is subjected to accelerated and pulsed ion beams which comprise one of the nuclear reactants. For example the following reactants may be employed. Protons and deuterons and electrons are employed for the ion beams. The proton deuteron and electron beams are focused on condensed phase fuels comprising in a preferred embodiment heavy isotopes of hydrogen (deuterium and tritium) the isotopes of lithium, berylium and boron. The preferred reactions for the process of this invention are

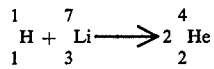

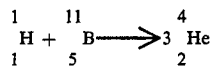

since these two reactions are nuclearly clean and produce only $^4_2$ Helium and no radiactive elements. The condensed state fuels may be presented in elemental form or in the form of chemical compounds.

Isotopes of hydrogen may be employed in liquid form or in the form of hydrides and other suitable compounds formed between the light elements and hydrogen. Lithium, berylium and boron are solids which can be made into wire, filament or tape in a continuous endless form. Further, these elements conduct electricity and are utilized in an embodiment of this invention as the component of a beam accelerating, focusing, and synchronizing system. The condensed state fuels may also be presented as a liquid in a jet form, in pellets mounted on a carrier, or on portions of liquid carried in a hollow filament. The solid fuels may be presented in a continuously formed or extruded slender body comprising substances including metals, their alloys and suitable organic and inorganic substances including polymers. The said nuclear fusion device may also be employed as a neutron source. The following reactions used for neutron generation are given in Table I.

Examples of nuclear reactions suitable for the nuclear fusion device of the present invention are listed also in Table I.

BRIEF DESCRIPTION OF THE DRAWINGS

FIG. 1a is a top crossectional view of a fusion reaction chamber comprising a centrally mounted condensed state nuclear fusion fuel element surrounded by ion source stations whose output ion beams are accelerated, focused and synchronized by a set of concentric elements comprising accelerating electrodes forming channels that direct the said beams of ions on the said centrally mounted fuel element.

FIG. 1b is a side crossectional view of the fusion reaction chamber showing two ion sources and two opposed pairs of accelerating and focusing electrodes forming and guiding the ion beams onto the fuel element in the center.

FIG. 2 is a block diagram showing fuel and waste flow, linear element forming stations and, reaction chamber and the electrical energy generating station.

FIG. 3 is a transverse representation showing two ion beams focused on the linear condensed state fuel element.

FIG. 4 is a schematic representation in three dimensional perspective of six beams focused simultaneously on a condensed state nuclear fuel element.

FIGS. 5a to h are representations of various forms of the condensed state linear fuel elements.

FIGS. 6a to c are transverse crossectional representation of ion source electrode for the generation of ions derived from the isotopes of hydrogen.

DESCRIPTION

In FIG. 1a is the view from the central crosssection of the fusion reaction chamber.

FIG. 1b represents the side view of the same chamber. The fusion reaction chamber can be cylindrical or spherical. The chamber consists of concentric cylinders 2, 3, 4, 5, 6, 7, 8 or more than that, or of conspheric spheres 2, 3, 4, 5, 6, 7, 8 or more. These cylinders or spheres are made of conducting material. In these spheres are built focusing and accelerating electrodes 10, 11, 12, 13, 14, 15, 16 or more. These electrodes are placed on radial direction as shown in FIG. 1a. The sources of protons[1] is placed at the entrance of the electrodes. The material for the nuclear fusion reaction is placed at the center and is numbered 9. It can be any light element, preferably not producing neutrons. Each time an accelerating pulse is applied on the focusing and accelerating electrodes 10, 11, 12, 13, 14, 15, 16 or more a reaction of fusion occurs at 9, and the next pulse the electrode 9 is renewed by feeding system activated from outside. The reaction products are collected on the outside electrode 18 or more. The essential property is the fact that the accelerating pulse on all electrodes is absolutely synchronous. The fusion raction chamber is in vacuum.

[1] See Table I.

The block diagram of FIG. 2 depicts schematically the movement the nuclear fusion fuels and the extraction of electrical energy in the continuous process of the present invention. 22 is the storage of the condensed state nuclear fusion fuel which may be solid or liquid. This fuel may be comprised for example of isotopes, hydrogen, lithium, berylium and boron. These elements may be present in elemental form or in combined form with other elements. Isotopes of hydrogen may be introduced as a fluid jet. Metals such as lithium and berylium can enter the nuclear reaction chamber in form of a wire or a thin ribbon. Elemental boron may be introduced as a filament or a ribbon. These and other means of introducing fuel elements into the reaction chamber are further described in connection with FIGS. 5a to i. The fuel is transported through channel 30 to the forming station 24 where it is transformed into a continuous linear body. Station 24 may for example be a wire forming station or a continuous extruder producing a slender linear element such as a thin ribbon, a filament and the like. FIG. 25 represents a structuring station introducing for example a transverse structural modification or attaching fuel elements to a linear carrier formed previously in station 25. The linear element is than transported by means forwarding and guiding rolls 29' and 29" into the nuclear fusion reaction chamber 26 where it is reacted with intense ion beams comprising protons, deuterons or tritons which are transported by a path 29 from the storage station 21 in the direction shown by arrow $R_3$. The energy produced by the nuclear fusion reaction is converted into electricity in the power plant 28 and the reaction products are passed by a transporting path 27 into the storage station 23.

FIG. 3 is a crossectional schematic representation of a part of the reaction chamber 26. The linear element 9 is fed from the applicator 36 into the reaction zone 38 where it is subject to two opposed ionized particle beams 32 and 34 produced by ion generating stations 31 and 33 and focused by electric or magnetic lenses 35 and 37. The two beams are focused on the same locus 39 of the linear element 9 and are synchronized in time so as to be pulsed, focused and applied simultaneously. Of the two said beams 32 and 34 each may comprise the same ions or different ions or one may be composed of ions the other beam may comprise electrons. Mixtures of ions in a single ion beam may also be employed. Ion generating stations are well known in the art but produce a disappointingly small number of ions per pulse. A special ion source is described in connection with FIGS. 6a to 6c'.

A multiplicity of beams may be employed all synchronized and focused on a single target focus of the fuel elements. FIG. 4 is a schematic representation of a fuel element 9 receiving synchronized and focused beam pulses 42, 42', 43, 43' and 45, 45' approaching the fuel element 9 along the cartesion coordinates x, y and z of which x and y are in the plane 40 and Z is perpendicular to the said plane. The nuclear fuel element 9 may constitute a filament or wire 50 having a diamenter 49 (the element 50 may also represent a thin stream of liquid fuel 9) or a ribbon 52 of a width 53 and thickness 51 as shown in FIGS. 5a and 5b respectively. Alternatively fuel elements 9 may be mounted on carrier means as is shown in FIGS. 5c to 5i. Such a mounting of small fuel elements on a carrier is an advance over prior art where unsupported pellets have been employed in the area of laser fusion. The carrier mounted fuel elements provide for (1) exact positioning of the fuel element 9 (2) synchronization of the beam pulses and focusing a feat that would be hard to duplicate with an unsupported fuel element and (3) introduction of electricity into the reaction region by using an electrically conductive material for the linear element whether it comprises nuclear fusion fuel itself or acts as a carrier. Fuel elements are mounted on carriers in the following manner: Fuel elements 9 on a wire or filaments 50 (FIG. 5c); Fuel elements 9 on a ribbon or tape 52 (FIG. 5d); Fuel elements 9 in a hollow filament 54 having a lumen 55 and a wall 57 (FIG. 5e)—The fuel element 9 may be solid or liquid; two parallel wires or filaments 50 and 50' connected by a wavy filament 59 which carries fuel elements 9 mounted in between the two parallel filaments 50 and 51' (FIG. 5f); Filament and wire 50 attached to short wire or fibers 59 which are periodically mounted and carrying fuel elements 9 on their free ends (FIG. 5g); A ribbon 52 carrying a fuel strip 9 (FIG. 5h); and a pair of parallel filaments or wires connected with transverse wire or filament bridges 59" on which the fuel elements 9 are mounted (FIG. 5i).

A solid state ion source for emitting positive hydrogen ions is described in FIGS. 6a to 6c'. This electrode may emit protons, deuterons and tritons. In FIG. 6a and 6a' the electrode is shown tipped with a sponge 62; in FIG. 6b and 6b' it is shown tipped with whiskers or wires 64 which may also be in the inside chamber 63 where the wires are given the numeral 61. Razor blade edges 65 tip the ion source in FIGS. 6c and 6c'. The razor blade edges may also be placed inside of the ion source chamber cavity 63 where they are assigned the numeral 67. The wall 66 of the chamber 60 is permeable to hydrogen and is kept at high positive potential respect to the extractor electrode 70 and with respect to ground. The wall 66 of the ion source 60 and elements 62, 64, 61, 65, 67 are preferentially palladium but could be made of a variety of metals comprising transition metals and their alloys including platinum, and iron. The wall 66 of the ion source 60 may be heated to increase the mobility of the hydrogen through it. The chamber 63 of the ion source 60 contains hydrogen, deuterium or tritium gas under pressure. In an embodiment of the invention the ion source 60 comprises an electrolytic cell having as one electrode the wall 66, of the ion source 60 and another electrode 69. The chamber 63 contains a suitable hydrogen containing electrolyte and the two said electrodes are maintained at a proper electrolysis potential, the hydrogen deposited at the electrode wall 66 of the ion source 60 is stripped to the positive hydrogen ion by maintaining a high positive potential on the wall 66 with respect to the extractor and accelerator 70 and ground. In this manner a powerful ion source for protons, deuterons and tritons is obtained. For example molten lithium hydride serves as the electrolyte. By means of a suitable potential electrode 69 is made a cathode and the wall 66 of the ion source is made the anode. Lithium metal deposits on electrode element 69 and the hydrogen which enters the electrode wall 66 (which is biased strongly positive, as described above) is stripped to protons and extracted by the extractor electrode 70. In this manner deuterons and tritons are also obtained. The ion source 60 produces ions also with a smooth outside wall 66, but the emmission is enhanced by an increase in surfaces of the wall 66 and by the addition of sharp points or edges to the surfaces of the said wall. Among electrolytes suitable for depositing hydrogen on and into a palladium electrode are salts and acids containing acidic hydrogens, metal hydroxides and metal hydrides. The electrolyte mepdium can be anhydrous, aqueous and can use organic and inorganic solvents. Superheated steam below and above the critical region may be used as a medium.

Among the nuclides comprising at least in part the material of the condensed state nuclear fusion fuel and-/or the material of the carrier of the said fuel elements are those which constitute at least in part the first three horizontal rows of the periodic table of elements.

The preferred parameters for the said nuclear fusion reactions fall into the following ranges:

(One) Crossection (diameter or thickness) of the nuclear fusion fuel elements serving as the target for the ion beam: microns to milimeters.

(Two) Energy of the ions in the beam: 10 kev to 5 MeV.

(Three) Energy content of a pulse or of a pulse set: 1 kilojoule to 10 megajoules.

(Four) Pulse duration: 1 nanosecond to several miliseconds.

TABLE I

Examples of Exothermic Nuclear Reactions
Suitable for the Nuclear Fusion Device CSIB "Clean" Reactions $$_1^1H + {}_3^7Li \longrightarrow 2\, {}_2^4He$$

$$_1^1H + {}_5^{11}B \longrightarrow 3\, {}_2^4He$$

Neutron Producing Reactions $$_1^2D + {}_1^2D \longrightarrow {}_2^3He + {}_0^1n$$

$$_1^2D + {}_1^3T \longrightarrow {}_2^4He + {}_0^1n$$

$$_1^2D + {}_3^6Li \longrightarrow {}_4^7Be + {}_0^1n$$

TABLE I-continued

Examples of Exothermic Nuclear Reactions
Suitable for the Nuclear Fusion Device CSIB $$_1^1H + {}_{11}^{23}Na \longrightarrow {}_{12}^{23}Mg + {}_0^1n$$

We claim:

1. A solid state ion source for emitting positive hydrogen ions such as protons, deuterons, and tritons comprising a solid wall forming a chamber wall, said wall being permeable to hydrogen, said chamber juxtaposed to an extractor electrode of opposite polarity, said chamber containing hydrogen isotopes in form of ions therein in liquid form or combined with another material, said chamber having disposed therein in an inner electrode such that said inner electrode and said chamber are maintained at an electrolysis potential, whereby hydrogen ions generated at the wall of said chamber are extracted to the wall of said chamber by said extractor electrode in the form of an ion source.

2. A solid state ion source, according to claim 1, wherein said solid wall is at least one member selected from the group consisting of palladium, a transition metal, an alloy of palladium and an alloy of a transition metal.

3. A solid state ion source, according to claim 1, wherein the wall of said chamber is at an elevated temperature.

4. A solid state ion source, according to claim 1, wherein said isotope of hydrogen is at least one member selected from the group consisting of hydrogen gas and deuterium gas.

5. A solid state ion source, according to claim 1, wherein said isotope of hydrogen is in the form of a molten lithium hydride.

6. A solid state ion source, according to claim 1, wherein the said isotope of hydrogen is in the form of an species containing an ionizable hydrogen.

7. A solid state ion source, according to claim 1, wherein said isotope of hydrogen is in the form of a metal hydroxide.

8. A solid state ion source according to claim 1, wherein said chamber is tipped with whiskers or wires.

9. A solid state ion source according to claim 1, wherein said chamber is tipped with razor blade edges.

* * * * *